(12) United States Patent
Smith et al.

(10) Patent No.: US 12,505,363 B2
(45) Date of Patent: Dec. 23, 2025

(54) APPARATUS AND A METHOD FOR THE DETECTION AND IMPROVEMENT OF DEFICIENCY DATA

(71) Applicant: Strategic Coach, Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 6 days.

(21) Appl. No.: 18/142,312

(22) Filed: May 2, 2023

(65) Prior Publication Data

US 2024/0370748 A1 Nov. 7, 2024

(51) Int. Cl.
*G06N 5/048* (2023.01)
*G06N 3/006* (2023.01)
*G06N 3/0464* (2023.01)

(52) U.S. Cl.
CPC .......... *G06N 5/048* (2013.01); *G06N 3/006* (2013.01); *G06N 3/0464* (2023.01)

(58) Field of Classification Search
CPC ....... G06N 5/048; G06N 3/0464; G06N 3/006
See application file for complete search history.

(56) References Cited

U.S. PATENT DOCUMENTS

| 8,006,223 | B2 | | 8/2011 | Boulineau | |
|---|---|---|---|---|---|
| 10,371,945 | B2 | * | 8/2019 | Samec | A61B 3/0025 |
| 2004/0138933 | A1 | | 7/2004 | Lacomb | |
| 2011/0178830 | A1 | | 7/2011 | Knowles | |
| 2017/0293851 | A1 | * | 10/2017 | Chawla | G06N 5/048 |
| 2019/0328322 | A1 | * | 10/2019 | Inada | G16H 20/60 |
| 2021/0137028 | A1 | * | 5/2021 | Zelkind | A01G 9/247 |
| 2021/0264520 | A1 | * | 8/2021 | Cummings | G06Q 40/12 |
| 2022/0335223 | A1 | * | 10/2022 | Tripathi | G06F 40/35 |
| 2024/0028953 | A1 | * | 1/2024 | Willardson | G06N 20/00 |

OTHER PUBLICATIONS

Tsourma et al. ("Online task distribution simulation in smart factories," 2018 2nd International Symposium on Small-scale Intelligent Manufacturing Systems (SIMS), 2018, pp. 1-6) (Year: 2018).*

(Continued)

*Primary Examiner* — Miranda M Huang
*Assistant Examiner* — Sidney Vincent Bostwick
(74) *Attorney, Agent, or Firm* — Caldwell Intellectual Property Law

(57) ABSTRACT

An apparatus for the detection and improvement of deficiency data is disclosed. The apparatus includes at least a processor and a memory communicatively connected to the at least a processor. The memory instructs the processor to receive an entity profile from a user, wherein the entity profile comprises a plurality of entity data. The memory instructs the processor to identify deficiency data as a function of the entity data. The memory instructs the processor to generate an automation suggestion as a function of the deficiency data and the entity data. The memory instructs the processor to predict progress data associated with the deficiency data as function of the implementation of the automation suggestion. The memory instructs the processor to display the progress data using a display device.

12 Claims, 10 Drawing Sheets

(56) References Cited

OTHER PUBLICATIONS

Shubert et al. ("Simulation-based decision support for evaluating operational plans", Operations Research Perspectives 2, 2015, pp. 36-56) (Year: 2015).*
Bagheri et al. (Autom Softw Eng, vol. 19, 2012, pp. 335-377) (Year: 2012).*
Kakulapti et al. ("Predictive analytics of HR—A machine learning approach," Journal of Statistics and Management Systems, 2020, pp. 1-13) (Year: 2020).*
Kaur, Rajdeep, Rakesh Kumar, and Meenu Gupta. "Food Image-based diet recommendation framework to overcome PCOS problem in women using deep convolutional neural network." Computers and Electrical Engineering 103 (2022): 108298. (Year: 2022).*
Song, Qinbao, et al. "A machine learning based software process model recommendation method." Journal of Systems and Software 118 (2016): 85-100. (Year: 2016).*

* cited by examiner

APPARATUS AND A METHOD FOR THE DETECTION AND IMPROVEMENT OF DEFICIENCY DATA

FIELD OF THE INVENTION

The present invention generally relates to the field of artificial intelligence. In particular, the present invention is directed to an apparatus and a method for the detection and improvement of deficiency data.

BACKGROUND

Existing processes for detection and analysis of deficiency data are inaccurate and slow. This is due at least in part to the complexity of measuring and comparing phenomena that often are contextually sensitive.

SUMMARY OF THE DISCLOSURE

In an aspect, an apparatus for the detection and improvement of deficiency data is disclosed. The apparatus includes at least a processor and a memory communicatively connected to the at least a processor. The memory instructs the processor to receive an entity profile from a user, wherein the entity profile comprises a plurality of entity data. The memory instructs the processor to identify deficiency data as a function of the entity data. The memory instructs the processor to generate an automation suggestion as a function of the deficiency data and the entity data. The memory instructs the processor to predict progress data associated with the deficiency data as a function of the implementation of the automation suggestion. The memory instructs the processor to display the progress data using a display device.

In another aspect, a method for the detection and improvement of deficiency data is disclosed. The method includes receiving, using at least a processor, an entity profile from a user, wherein the entity profile comprises a plurality of entity data. The method additionally includes identifying, using the at least a processor, deficiency data as a function of the entity data. The method includes generating, using the at least a processor, an automation suggestion as a function of the deficiency data and the entity data. The method includes predicting, using the at least a processor, progress data associated with the deficiency data as a function of the implementation of the automation suggestion. The method includes displaying, using the at least a processor, the progress data using a display device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for the detection and improvement of deficiency data. The apparatus includes at least a processor and a memory communicatively connected to the at least a processor. The memory instructs the processor to receive an entity profile from a user, wherein the entity profile comprises a plurality of entity data. The memory instructs the processor to identify deficiency data as a function of the entity data. The memory instructs the processor to generate an automation suggestion as a function of the deficiency data and the entity data. The memory instructs the processor to predict progress data associated with the deficiency data as a function of the implementation of the automation suggestion. The memory instructs the processor to display the progress data using a display device. Exemplary embodiments illustrating aspects of the present disclosure are described below in the context of several specific examples.

Figure 1:
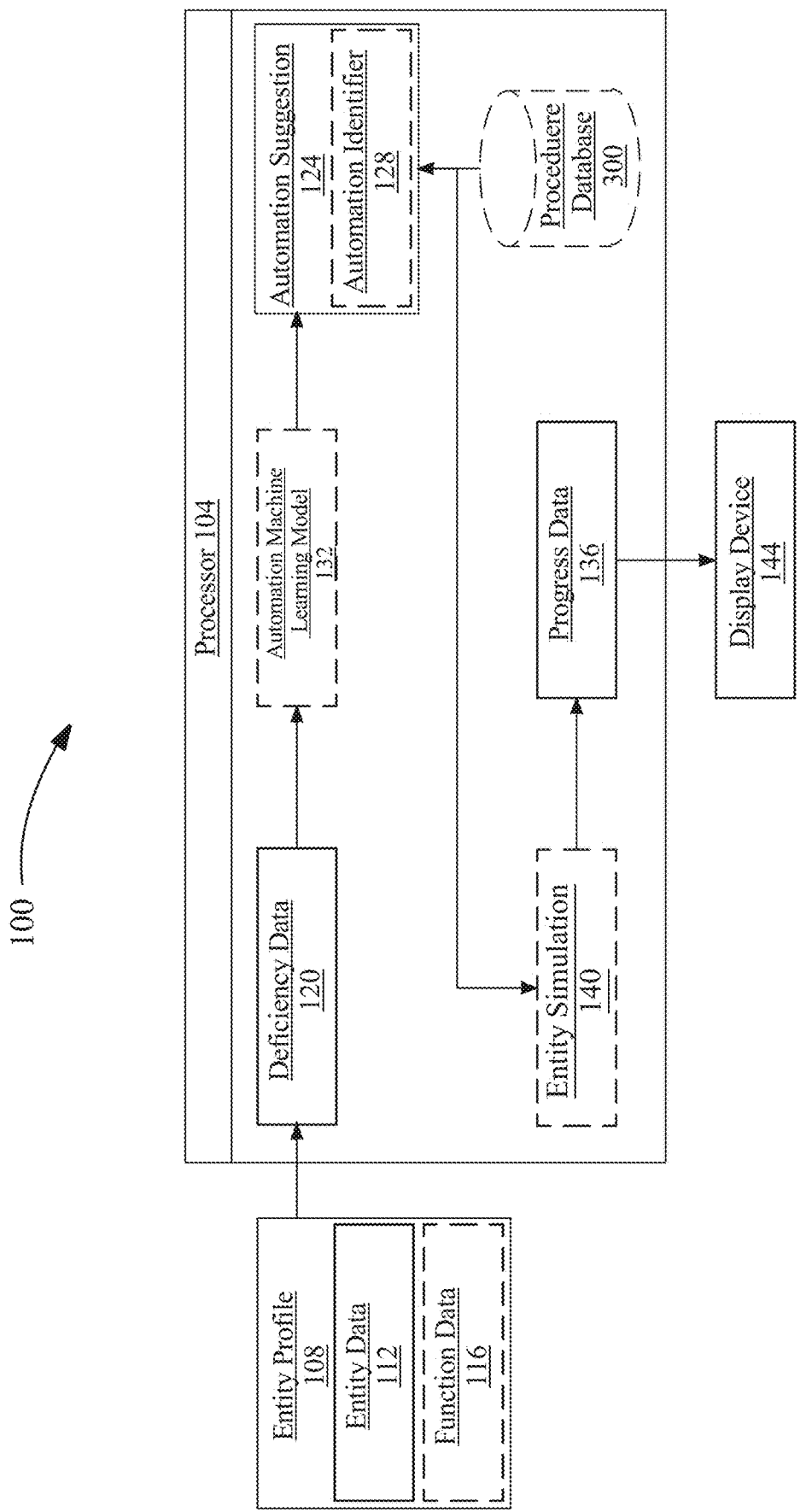
FIG. 1 is a block diagram of an exemplary embodiment of an apparatus for the detection and improvement of deficiency data.

Referring now to FIG. 1, an exemplary embodiment of apparatus 100 for the detection and improvement of deficiency data is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be configured to extract an entity profile 108 from a user. For the purposes of this disclosure, an "entity profile" is a data structure representing an entity. An entity profile 108 may be made up of a plurality of entity data 112. As used in the current disclosure, "entity data" is information associated with the entity. As used in the current disclosure, an "entity" is an organization comprised of one or more persons with a specific purpose. An entity may include a corporation, organization, business, group, and the like. An entity profile 108 may be created by a processor 104, a user, or a third party. As used in the current disclosure, a "user" is an authoritative figure within the entity. The user may include a manager, owner, or shareholder of the entity. The entity profile 108 may information regarding the entity's revenue, gross income, net income, business debts, a list of business expenses, current inventory, inventory history, sales information, human resource information, employee information, employee salaries, time cards, a list of company assets, a list of capital projects, accounting information, and the like.

With continued reference to FIG. 1, an entity profile 108 may include entity records. As used in the current disclosure, an "entity record" is a document that contains information regarding the entity. Entity records may include employee credentials, reports, financial records, medical records, business records, Asset inventory, sales history, sales predictions, and government records (i.e. birth certificates, social security cards, and the like). An entity record may additionally include an employee record. An employee record may include things like employee evaluations, human resource records, client files, invoices, timecards, driver's license databases, news articles, social media profiles and/or posts, and the like. Entity records may be identified using a web crawler. Entity records may include a variety of types of "notes" entered over time by the user, employees of the user, support staff, advisors, and the like. Entity records may be converted into machine-encoded text using an optical character reader (OCR).

With continued reference to FIG. 1, entity data 112 may include procedure data 116. As used in the current disclosure, "procedure data" is data associated with the procedures of the entity. As used in the current disclosure, a "procedure" is a process or system used by the entity. Alternatively, a procedure may be described as a series of tasks that are performed by a user or an agent of the user. A series of tasks may be configured to be performed in succession to achieve a consistent result. Procedure data 116 may comprise employee procedure data 116, owner procedure data 116, manager procedure data 116, and the like. Procedure data 116 may describe a procedure such as a cleaning procedure, billing procedure, building procedure, shipping procedure, client interface procedure, training procedure, evaluation procedures, safety procedures, human resource procedures, grievance procedures, time management procedures, scheduling procedure, disciplinary procedures, and the like. Procedure data 116 may represent internal or external procedures as it relates to the entity.

Still referring to FIG. 1, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases. a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, entity profile 108 may be generated using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile the entity profile 108 and entity data 112. The web crawler may be seeded and/or trained with a reputable website, such as the user's business website, to begin the search. A web crawler may be generated by a processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract entity records, inventory records, financial records, human resource records, past entity profiles 108, sales records, user notes, and observations, based on criteria such as a time, location, and the like.

With continued reference to FIG. 1, processor 104 is configured to identify deficiency data 120 as a function of entity data 112. As used in the current disclosure, "deficiency data" is data related to a deficient procedure associated with procedure data 116. A deficient procedure may be a procedure that is ineffective, inefficient, overly time consuming, costumes too many resources, and the like. A procedure may be deemed deficient if it is not meeting the needs of the entity. In a non-limiting example, if entity data 112 indicates that the entity is not satisfied with the procedure may be deemed inefficient. A procedure may also be deemed deficient if it is quantifiably worse by a large margin than the ideal procedure. As used in the current disclosure, an "ideal procedure" is a procedure that accomplishes the needs of the entity safely and efficiently. In some embodiments, a list of ideal procedures may be stored in a database, such as database 300. In some embodiments, processor 104 may identify an ideal procedure by querying a database, wherein the database comprises a listing of ideal procedures that are similar to the current procedures of the user. In an embodiment, processor 104 may calculate an ideal procedure as a range of efficiency. An ideal procedure range may be calculated by averaging efficiency of a plurality of processes from past users. An ideal procedure may be based on a plurality of queried ideal procedures that are similar to the procedures of the entity. In a non-limiting example, processor 104 may query a database for the ideal procedure. Processor 104 may be configured to compare the current procedure data 116 to the procedure data of an ideal procedure. If the current procedure data 116 is below a certain threshold as compared to an ideal procedure that procedure may be deemed deficient. In a non-limiting example, an entity has a process for shipping products to customers. Procedure data 116 indicates that the procedure to ship a standard order takes a total of 45 minutes. Processor 104 may query a database for an ideal procedure for shipping similar products. The query returns that the ideal procedure takes 15-25 minutes per order to ship the products. Processor 104 may generate deficiency data 120 that indicates that the current procedure is deficient. Processor 104 may additionally determine if a procedure is deficient by identifying the deficient tasks within the process. As used in the current disclosure, a "deficient task" is a task or set of tasks, within a process, that is inefficient. A deficient task may be a task that is ineffective or inefficient. A deficient task may include tasks that are time consuming or costumes too many resources, and the like. Improvement deficiency data 120 may include tracking or predicting the growth of one or more systems, processes, procedures, aspects, and/or attributes of an entity or user. Predicting the growth and/or change of deficiency data 120 may be done using a growth simulation, various machine learning models, fuzzy inference sets, and the like. The growth of the deficiency data 120 may be reflected as growth data as represented in U.S. patent application Ser. No. 18/141,725, filed on May 1, 2023, titled "APPARATUS AND A METHOD FOR HIGHER-ORDER GROWTH MODELING," which is incorporated by reference herein in its entirety.

With continued reference to FIG. 1, processor 104 may determine if a procedure is deficient as a function of a deficiency quantifier. A "deficiency quantifier," as used in this description, is a quantitative variable and/or field containing a number representing the degree to which a process is efficient. Processor 104 may calculate deficiency quantifier using one or more data regarding the processes of including procedure data 116 and entity data 112. For instance, a deficiency quantifier may be calculated as a function of the efficiency criteria. As used in the current disclosure, "efficiency criteria" is a set of standards to determine the efficiency of a process. Efficiency criteria may be related to the consumption of time, monetary resources, space, resources, energy, manpower, and the like. Efficiency criteria may be generated by processor 104 as a function of the type of procedures that are implemented by the entity. Processor 104 may generate one or more numerical quantities which may be combined by addition and/or multiplication to derive a deficiency quantifier. As a non-limiting, illustrative example, the deficiency quantifier may be initialized to a maximal value of 1 and each numerical quantity to be used to compute deficiency score may be a number between 0 and 1 which may be multiplied by the deficiency quantifier to furnish a final result between 0 and 1 which may be used to quantify degree to which a process is efficient. As a further example, component quantities may be combined in a calculation performed using a machine-learning process and/or model; for instance, and without limitation, relationships between inputs as described below and reliability may be sufficiently complex as to render multiplication of factors insufficient to capture all cases, in which case a machine-learning process may be used to generate a more complex model that effectively captures such relationships to generate an accurate result.

With continued reference to FIG. 1, processor 104 may generate a deficiency quantifier using machine learning model such as a quantification classifier. In some embodiments, a quantification classifier may be implemented using a fuzzy inferencing system, as described hereinbelow. As used in the current disclosure, a "quantification classifier" is a supervised machine-learning model that sorts inputs into categories or bins of data, outputting the categories or bins of data and/or labels associated therewith. The quantification classifier may be consistent with the classifier or machine learning model described below in FIG. 2. Inputs to the quantification classifier may include entity profile 108, entity data 112, procedure data 116, examples of deficiency quantifiers, and the like. Outputs to the quantification classifier may include deficiency quantifiers. Quantification training data is a plurality of data entries containing a plurality of inputs that are correlated to a plurality of outputs for training a processor by a machine-learning process to classify procedure data 116 to examples of quantifier data 120. Quantification training data may be received from database 300. Quantification training data may contain information about entity profile 108, entity data 112, procedure data 116, examples of deficiency quantifiers, and the like. Outputs to the quantification classifier may include a deficiency quantifier specific to procedure data 116. Quantification training data may correlate procedure data 116 to examples of quantifier data 120. Classification may be performed using, without limitation, linear classifiers such as without limitation logistic regression and/or naive Bayes classifiers, fuzzy inference sets, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1., a processor 104 may calculate deficiency data 120 using a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase or even stored in hardware in application-specific platforms. Data within the lookup table may include previous examples of deficiency data 120 compared to procedure data 116. Data within the lookup table may be received from database 300. Lookup tables may also be used to identify deficiency data 120 by matching an input value to an output value by matching the input against a list of valid (or invalid) items in an array. In a non-limiting example, procedure data 116 may that an entity has to accomplish a set of tasks. Examples of deficiency data 120 indicate that the completion time for a set of tasks has historically been between 45 minutes and 1 hour, whereas the current set of tasks represented by the procedure data 116 takes nearly 2 hours to complete. A lookup table may look up the user's procedure data 116 as an input and output deficiency data 120 indicating that the employee should complete the task in between 1-1.5 hours or the task will be deemed deficient. Processor 104 may be configured to "lookup" or input one or more procedure data 116, entity data 112, examples of deficiency data 120, and the like. Whereas the output of the lookup table may comprise deficiency data 120. Data from the lookup table may be compared to examples of deficiency data 120, for instance, and without limitation using string comparisons, numerical comparisons such as subtraction operations, or the like; discrepancies may indicate data faults. Alternatively or additionally, a query representing elements of deficiency data 120 may be submitted to the lookup table and/or a database, and an associated data fault identifier stored in a data record within the lookup table and/or database may be retrieved using the query.

With continued reference to FIG. 1, processor 104 may identify deficiency data 120 using a deficiency classifier. As used in the current disclosure, a "deficiency classifier" is a machine-learning model that sorts inputs into categories or bins of data, outputting the categories or bins of data and/or labels associated therewith. The deficiency classifier may be consistent with the classifier or machine learning model described below in FIG. 2. Inputs to the deficiency classifier may include entity profile 108, entity data 112, procedure data 116, examples of deficiency data 120, and the like. Outputs to the deficiency classifier may include deficiency data 120. Deficiency training data is a plurality of data entries containing a plurality of inputs that are correlated to a plurality of outputs for training a processor by a machine-learning process to classify entity data 112 to examples of deficiency data 120. Deficiency training data may be received from database 300. Deficiency training data may contain information about entity profile 108, entity data 112, procedure data 116, examples of deficiency data 120, and the like. Outputs to the deficiency classifier may include deficiency data 120. Deficiency training data may correlate entity data 112 to examples of deficiency data 120. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, a machine-learning model, such as a deficiency classifier, may be implemented as a fuzzy inferencing system. As used in the current disclosure, a "fuzzy inference" is a method that interprets the values in the input vector (i.e., entity data 112 and examples of deficiency data 120.) and, based on a set of rules, assigns values to the output vector. A set of fuzzy rules may include a collection of linguistic variables that describe how the system should make a decision regarding classifying an input or controlling an output. An example of linguistic variables may include variables that represent one or more deficiency data 120. Examples of linguistic variables may include terms such as "Completely Deficient," "Moderately Deficient," and "No Deficiency Detected." Entity data 112 and examples of deficiency data 120 may each individually represent a fuzzy set. The deficiency data 120 may be determined by a comparison of the degree of match between a first fuzzy set and a second fuzzy set, and/or single values therein with each other or with either set, which is sufficient for purposes of the matching process.

With continued reference to FIG. 1, processor 104 may be configured to generate an automation suggestion 124 as a function of the deficiency data 120. As used in the current disclosure, an "automation suggestion" is a notification that a deficient program may be solved using a solution based on automated technology. An automation suggestion 124 may notify the user that there is a technological solution to the deficiencies of the processes. An automated suggestion 124 may provide the user with solutions to fix the deficiencies of the processes using hardware or software solutions. In a non-limiting example of a hardware solution, an automation suggestion 124 may indicate that adding an additional forklift will provide a boost in efficiency to the inventory processes of an entity. In another non-limiting example of a software solution, an automation suggestion 124 may provide that incorporating human resources software to automate portions of the hiring process will also improve the deficient process. An automation suggestion 124 may include specific suggestions of the types of hardware and software that should be implemented by the entity. Hardware suggestions may include the purchase of additional equipment such as trucks, forklifts, pallet jacks, pumps, assembly lines, lawn equipment, office space, work spaces, tools, safety equipment, and the like. Software suggestions may include the purchase of additional equipment such as shipping software, organizational software, planning software, human resources software, safety software, billing software, client interfacing software, time management software, and the like.

With continued reference to FIG. 1, processor 104 may determine an automation identifier 128 as a function of the deficient task. As used in the current disclosures, an "automation identifier" is an identification of the type of solution that is needed to cure the deficiencies of the procedure. Types of solutions may include a hardware solution, software solution, personnel solution, and the like. A hardware solution is a solution that requires the user to implement additional or new hardware technologies into the processes represented by procedure data 116. A software solution is a solution that requires the user to implement software technologies into the processes represented by procedure data 116. This may include any hardware or software suggestion as mentioned herein above. A determination of the deficient task may be used to generate an automation identifier 128. In a non-limiting example, if the deficient task is a bottleneck of manpower, meaning there are too many tasks and not enough personnel to fulfill them a software solution or personnel may be implemented. A software solution may be used to automate routine and repeatable tasks thus eliminating the need for additional manpower. Alternatively, if the tasks are variable and sporadic a processor 104 may determine that hiring additional personnel may be a better solution. In another non-limiting example, if the deficient task is the lack of resources such as a lack of equipment, a hardware solution may be suggested.

With continued reference to FIG. 1, processor 104 may generate an automation suggestion 124 using an automation machine-learning model 132. As used in the current disclosure, an "automation machine-learning model" is a machine-learning model that sorts inputs into categories or bins of data, outputting the categories or bins of data and/or labels associated therewith. Automation machine-learning model 132 may be consistent with the classifier or machine learning model described below in FIG. 2. Inputs to the automation machine-learning model 132 may include entity profile 108, entity data 112, procedure data 116, deficiency data 120, deficient tasks, examples of automation suggestions 124, examples of automation identifiers 128, and the like. Outputs to the automation machine-learning model 132 may include automation identifier 128 and/or automation suggestion 124. Automation training data is a plurality of data entries containing a plurality of inputs that are correlated to a plurality of outputs for training a processor by a machine-learning process to correlate deficient tasks to examples of automation identifiers 128, or correlate deficiency data 120 to examples of automation suggestions 124. Automation training data may be received from database 300. Automation training data may contain information about the entity profile 108, entity data 112, procedure data 116, deficiency data 120, deficient tasks, examples of automation suggestions 124, examples of automation identifiers 128, and the like. Automation training data may correlate examples of automation identifiers 128, or alternatively correlate deficiency data 120 to examples of automation suggestions 124. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, the processor may be configured to generate a machine-learning model, such as automation machine-learning model 132, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A\ P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a machine-learning model, such as automation machine-learning model 132, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where there are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm $l=\sqrt{\Sigma_{i=0}^{n} a_i^2}$, where $a_i$ is attribute number experience of the vector. Scaling and/or normalization may function to make vector comparison independent of absolute quantities of attributes, while preserving any dependency on the similarity of attributes; this may, for instance, be advantageous where cases represented in training data are represented by different quantities of samples, which may result in proportionally equivalent vectors with divergent values.

With continued reference to FIG. 1, processor 104 predicts progress data 136 associated with the deficiency data 120 as a function of the automation suggestion 124. As used in the current disclosure, "progress data" an is element of data related to the change of deficiency data 120. Progress data 136 may additionally be configured to predict a future change in deficiency data 120. Progress data 136 as it relates to the deficiency data 120 may be related to the change efficiency of one or more deficient tasks. Progress data 136 may additionally be related to the deficiency of procedure data 116 as it relates a single procedure or a group of procedures. Progress data 136 may additionally indicate the rate of change for the deficiency data 120. Progress data 136 may include a scalability factor. As used in the current disclosure, a "scalability score" is an indication of the scalability of a procedure. The scalability of a procedure may indicate how the feasibility of a given procedure grows as the entity grows. In a non-limiting example, a client-interface procedure of hand making a product may be non-deficient for the entity at its current stage. However, as the entity grows the scalability score of the product may rise exponentially meaning that procedure is unscalable. In an embodiment, progress data 136 may be related to one or more deficiency categories. Deficiency categories may include inefficiency, cost, time, resource consumption, quality, manhour consumption, number of man hours, hours of skilled labor, hours of non-skilled labor, management hours, and like. Progress data 136 may represent the change in the amount of work that is required to complete a process. In a non-limiting example, a deficiency data 120 may indicate that a total of 500 man-hours per week is required to complete a procedure associated with procedure data 116. Progress data 136 may indicate after the implementation of the automation suggestions it may take 356 hours per week to complete a procedure associated with procedure data 116.

With continued reference to FIG. 1, progress data 136 may include a prediction score, wherein the prediction score is data indicating the change in entity data 112 or deficiency data 120. Prediction score may indicate how well a particular procedure or employee has improved. A prediction score may include a numerical score such as a score of 1-100 wherein 1 may signify that an entity has had little improvement from an initial point to the current point and a higher score may signify that an entity had significant improvement from the initial point. A prediction score may additionally be calculated as a function of a time element. A prediction score taken at the three-month mark may be adjusted to fit the milestones or subgoals of the three-month mark.

With continued reference to FIG. 1, generating progress data 136 may include generating progress data 136 from an entity profile 108. A user may input progress data 136 indicating the growth that was achieved since the action or event. Progress data 136 may further be generated through a smart assessment wherein a user may score themselves, and answer questions and the like related to their growth in a particular area. Progress data 136 may be extracted from an entity profile 108 using a chatbot, OCR, or a WebCrawler as described throughout this application. A processor 104 may additionally be configured to generate progress data 136 by comparing the current state of the entity data 112 or entity profile 108 to previous iterations of entity data 112 and/or entity profile 108. In some cases, progress data 136 may be generated using a machine learning model as described in this disclosure. In some cases, progress data 136 may be generated using any algorithm as described in this disclosure.

With continued reference to FIG. 1, processor 104 may predict progress data 136 using a prediction machine-learning model. As used in the current disclosure, a "prediction machine-learning model" is a machine-learning model that sorts inputs into categories or bins of data, outputting the categories or bins of data and/or labels associated therewith. Prediction machine-learning model may be consistent with the classifier or machine learning model described below in FIG. 2. Inputs to the prediction machine-learning model may include entity profile 108, entity data 112, procedure data 116, deficiency data 120, deficient tasks, automation suggestions 124, automation identifiers 128, examples of progress data 136, and the like. Outputs to the prediction machine-learning model may include progress data 136 and/or prediction score. Prediction training data is a plurality of data entries containing a plurality of inputs that are correlated to a plurality of outputs for training a processor by a machine-learning process to correlate automation suggestions 124 to deficiency data 120, or an automation suggestion 124 to examples of progress data 136. Prediction training data may be received from database 300. Prediction training data may contain information about the include entity profile 108, entity data 112, procedure data 116, deficiency data 120, deficient tasks, automation suggestions 124, automation identifiers 128, examples of progress data 136, and the like. Prediction training data may correlate an automation suggestion 124 to examples of progress data 136. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 may be configured to predict progress data 136 using an entity simulation 140. As used in the current disclosure, an "entity simulation" is a simulation of the performance of the processes of the entity. Entity simulation 140 may include a theoretical construct representing a variety of business processes by a set of variables and a set of logical and/or quantitative relationships between them. The simulation may be run multiple times to ensure accuracy. The results of entity simulation 140 may be charted. Entity simulation 140 may include a simplified, often mathematical, framework designed to illustrate complex processes. Frequently, an entity simulation 140 posits several parameters, including personnel, resources, client management, and customer flow. A model may have various exogenous variables, and those variables may change to create various responses by economic variables. Entity simulation 140 may be configured to include investigation, theorizing, and fitting theories to the real world. An entity simulation 140 may include an economic model, a stochastic model, a non-stochastic model, a qualitative model, and the like. Entity simulation 140 may be configured to simulate every aspect of a business, this may include inventory management, personnel management, customer management, finance management, facility management, and the like. An entity simulation 140 may be configured to implement automation suggestion 124 on the processes represented by procedure data 116. Entity simulation 140 may be configured to simulate each task of a set of tasks within entity simulation 140. Entity simulation 140 may additionally predict the potential impact an automated suggestion would have over a given time. An entity simulation 140 may simulate one or more aspects of a business over a given time. An entity simulation 140 may be used to determine progress data 136 or an automation suggestion 124. An entity simulation 140 may be configured to generate updated entity data from an entity profile 108 after performing the simulation. As used in the current disclosure, "updated entity data" is entity data 112 taken to taken from an entity profile 108 after the implementation of automation suggestion 124. In a non-limiting example, an entity simulation 140 may implement an automation suggestion 124 which comprises replacing employees with an automated assembly line. Entity simulation 140 may simulate the work output of the new assembly line over a given time. The output of the improved procedure data 116 may be reflected in updated entity data, wherein the updated entity data reflects that the processes are 23% more productive since adding the new assembly line.

With continued reference to FIG. 1, processor 104 may generate an entity simulation 140 using a simulation machine-learning model. As used in the current disclosure, a "simulation machine-learning model" is a machine-learning model that sorts inputs into categories or bins of data, outputting the categories or bins of data and/or labels associated therewith. The simulation machine-learning model may be consistent with the classifier described below in FIG. 2. Inputs to the simulation machine-learning model may include an entity profile 108, entity data 112, procedure data 116, deficiency data 120, deficient tasks, automation suggestions 124, automation identifiers 128, examples of progress data 136, examples of entity simulation 140, and the like. Outputs to the strategy machine-learning model 128 may include entity simulation 140. Simulation training data is a plurality of data entries containing a plurality of inputs that are correlated to a plurality of outputs for training a processor by a machine-learning process to correlate an automation suggestion 124 to examples of entity simulation 140. Simulation training data may be received from database 300. Simulation training data may contain information about an entity profile 108, entity data 112, procedure data 116, deficiency data 120, deficient tasks, automation suggestions 124, automation identifiers 128, examples of progress data 136, examples of entity simulation 140, and the like. Simulation training data may correlate an automation suggestion 124 to examples of entity simulation 140. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 may be configured to generate an application plan as a function of entity simulation 140. As used in the current disclosure, an "application plan" is a set of instructions for the implementation of automation suggestions 124. An application plan may be generated as a function of entity simulation 140 or progress data 136. An application plan may include a plurality of instructions regarding how to implement the automation suggestions 124. In an embodiment, an application plan may be generated as a function of the identification of the automation suggestions 124. An application plan may include a series of sub-steps. In some embodiments, the sub-steps may be smaller or more simple steps used to progress the user toward achieving the application plan.

Still referring to FIG. 1, processor 104 may be configured to display the automation suggestion 124 and the progress data 136 using a display device 144. As used in the current disclosure, a "display device" is a device that is used to display a content processor 104. A display device 144 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
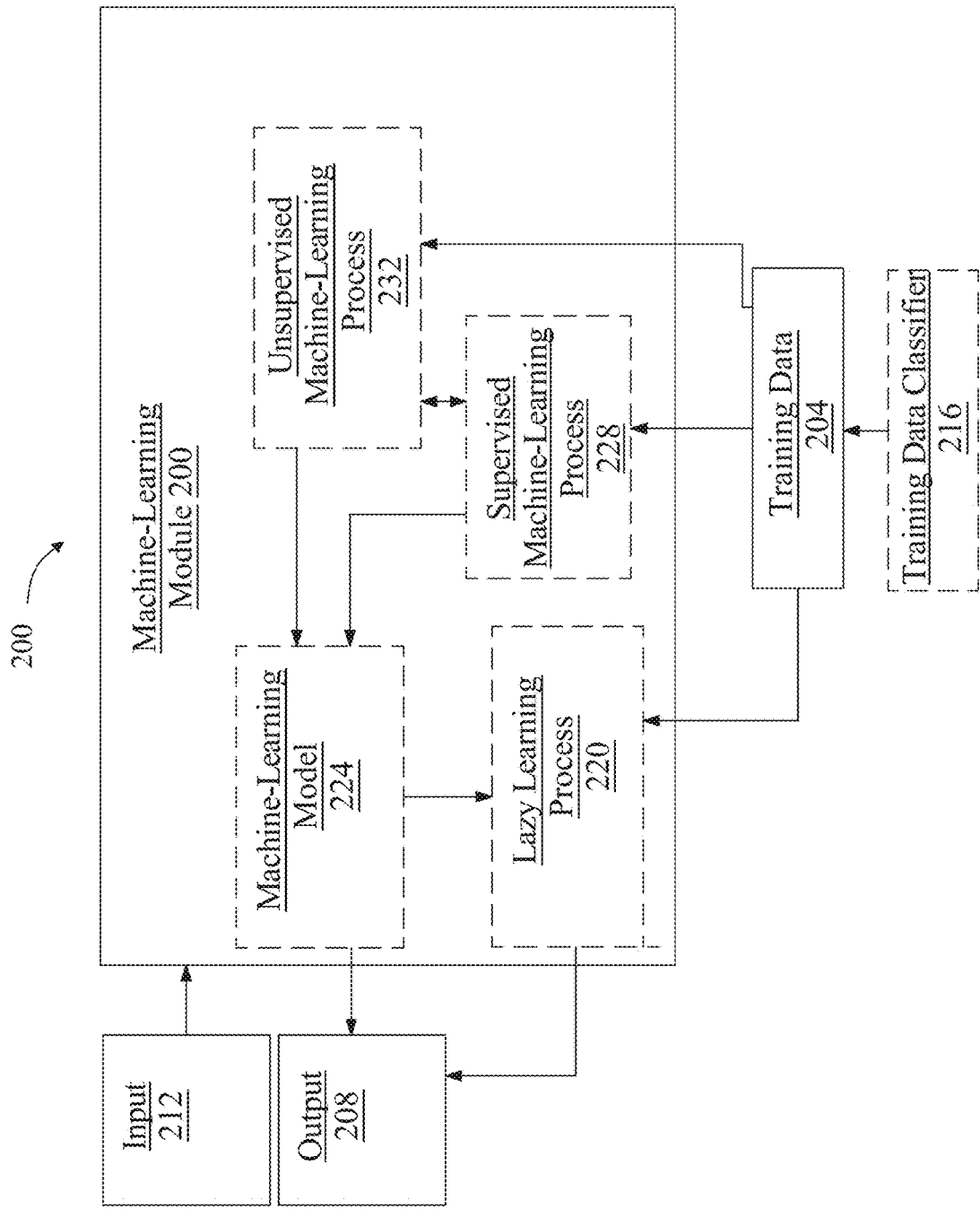
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning modules may perform determinations, classification, and/or analysis steps, methods, processes, or the like as described in this disclosure using machine-learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, maybe a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
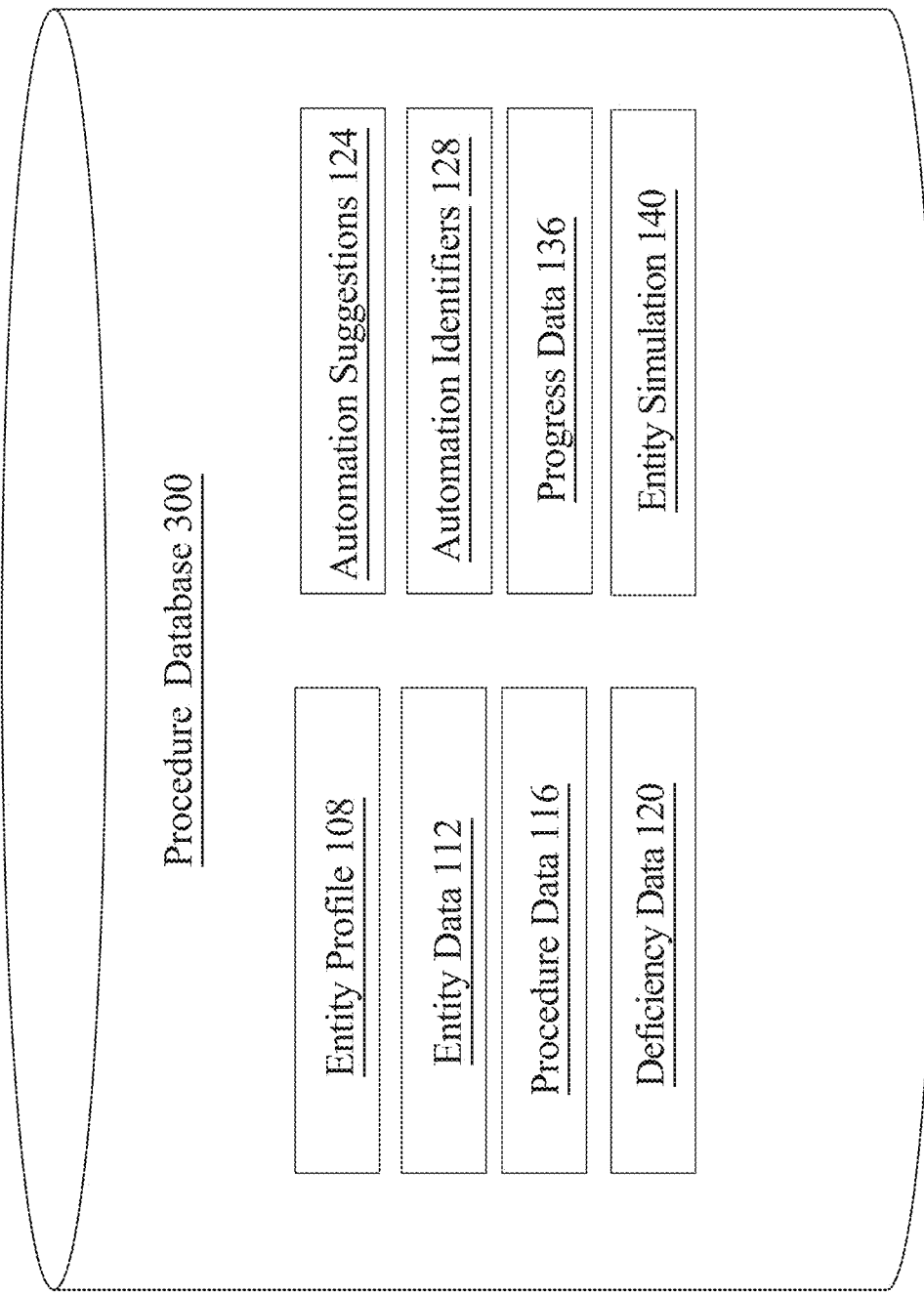
FIG. 3 is a block diagram of an exemplary embodiment of a procedure database.

Now referring to FIG. 3, an exemplary procedure database 300 is illustrated by way of block diagram. In an embodiment, any past or present versions of any data disclosed herein may be stored within the procedure database 300 including but not limited to entity profile 108, entity data 112, procedure data 116, deficiency data 120, deficient tasks, automation suggestions 124, automation identifiers 128, progress data 136, and the like. Processor 104 may be communicatively connected with procedure database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. Procedure database 300 may be implemented, without limitation, as a relational database, a key-value retrieval database such as a NOSQL database, or any other format or structure for use as a database that a person skilled in the art would recognize as suitable upon review of the entirety of this disclosure. Procedure database 300 may alternatively or additionally be implemented using a distributed data storage protocol and/or data structure, such as a distributed hash table or the like. Procedure database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
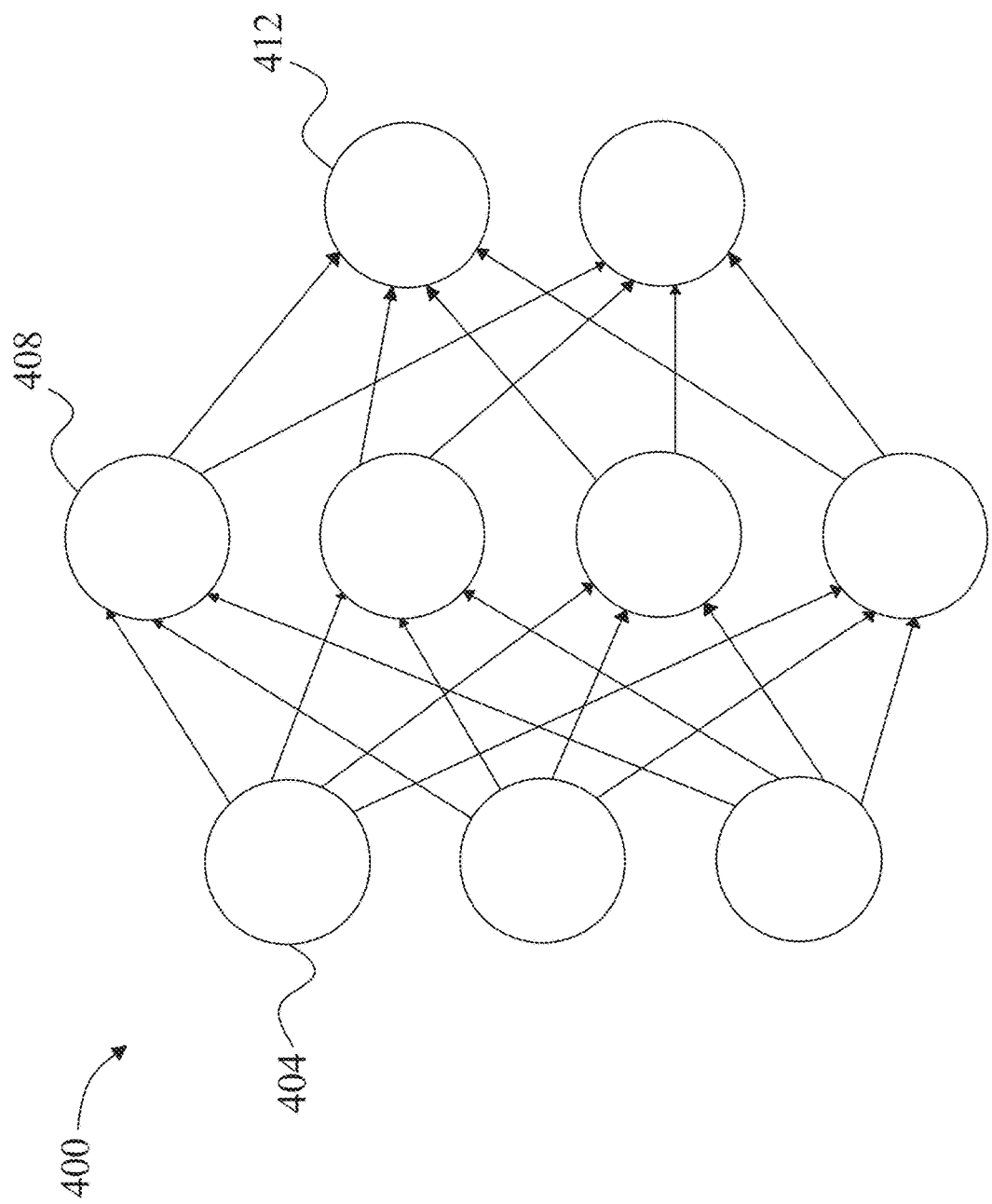
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
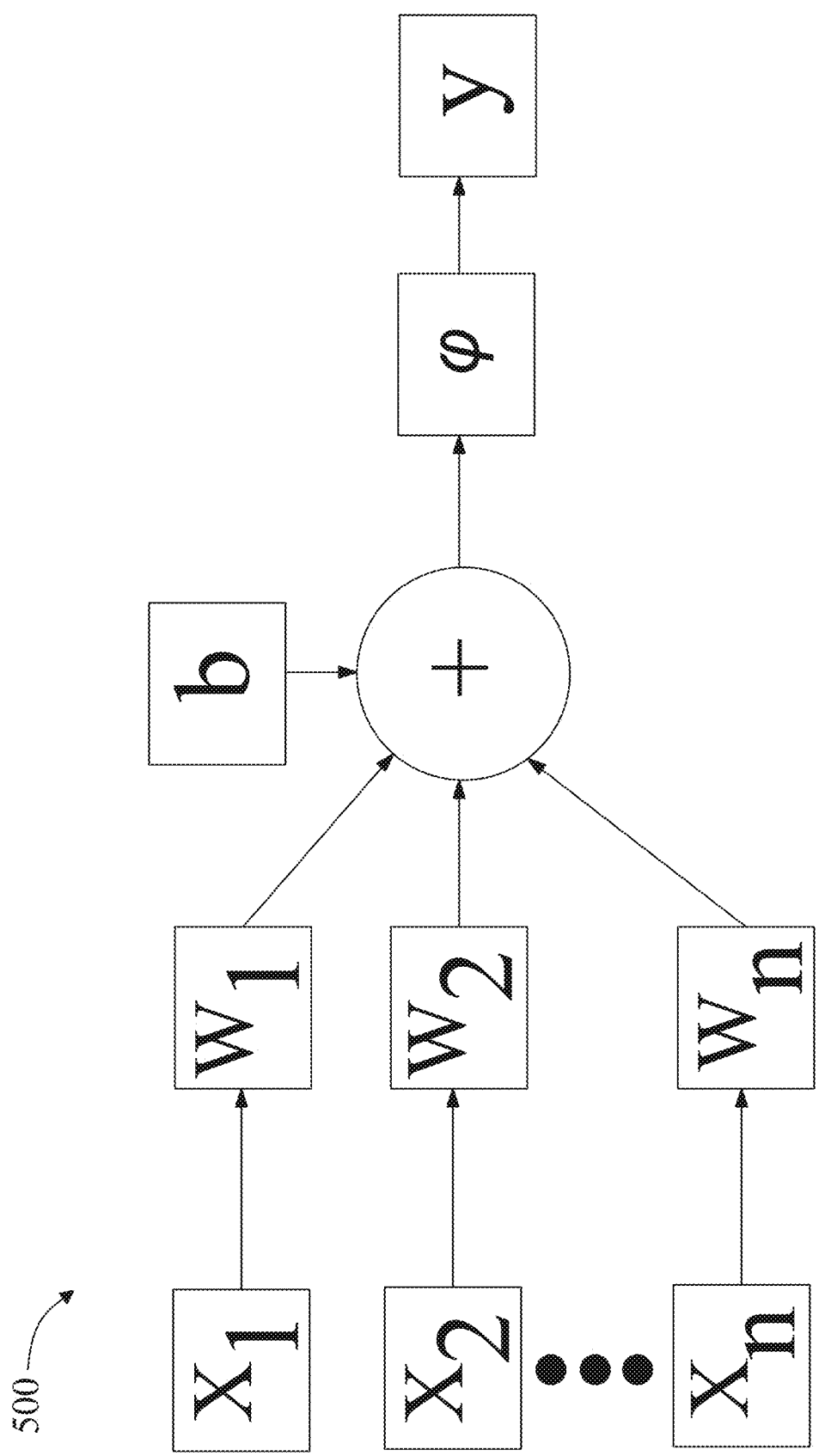
FIG. 5 is a diagram of an exemplary embodiment of a node of a neural network.

Referring now to FIG. 5, an exemplary embodiment of a node of a neural network is illustrated. A node may include, without limitation, a plurality of inputs x, that may receive numerical values from inputs to a neural network containing the node and/or from other nodes. Node may perform a weighted sum of inputs using weights $w_i$, that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or an "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
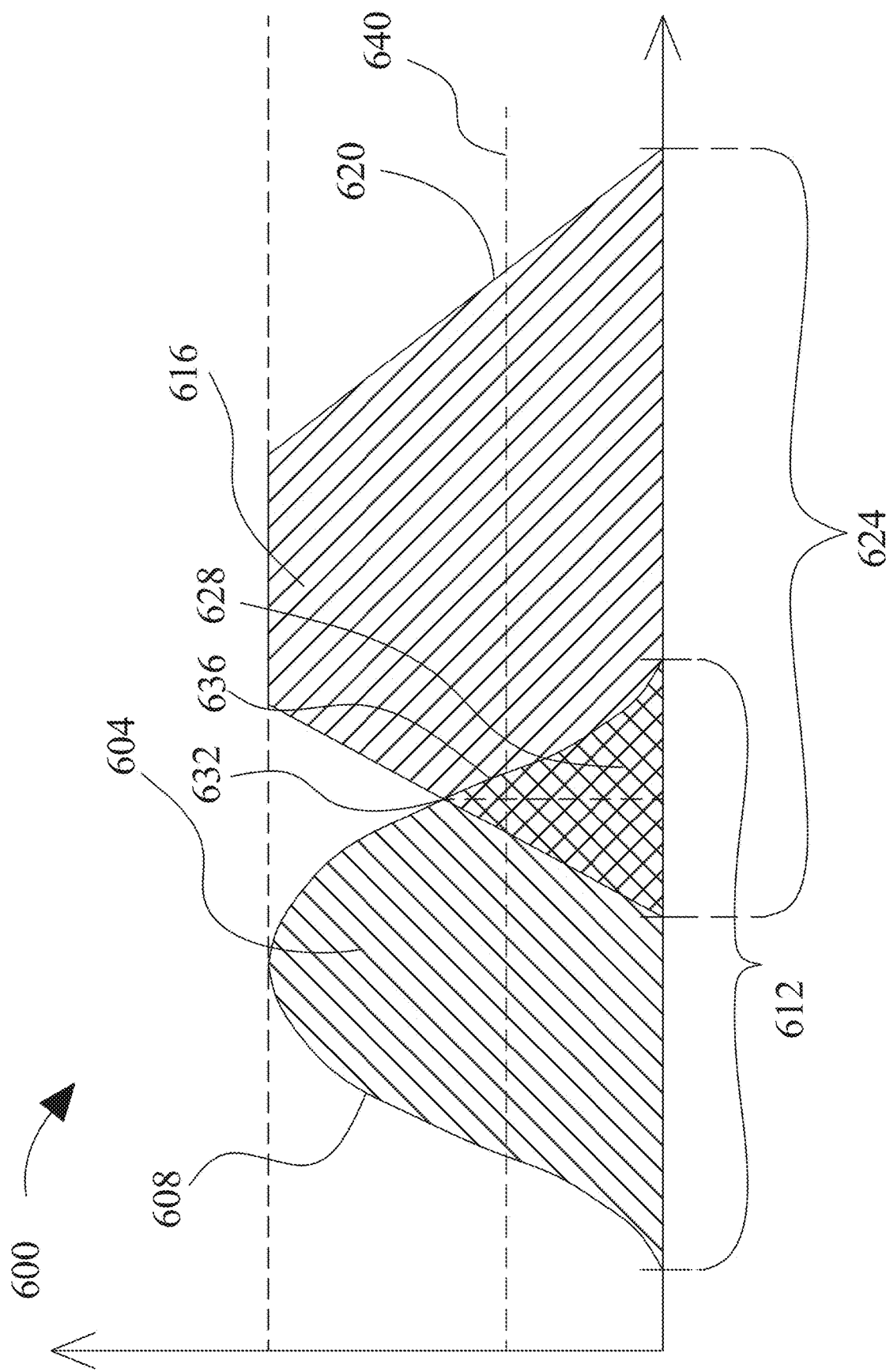
FIG. 6 an illustration exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent entity data 112 and examples of deficiency data 120 from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input entity data 112 and examples of deficiency data 120. For instance, an acceptance variable may represent a first measurable value pertaining to the classification of entity data 112 to examples of deficiency data 120. Continuing the example, an output variable may represent a deficiency data 120 tailored to the entity profile 108. In an embodiment, entity data 112 and/or examples of deficiency data 120 may be represented by their own fuzzy set. In other embodiments, deficiency data 120 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T (c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any entity data 112 and examples of deficiency data 120. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, deficiency data 120 may indicate a sufficient degree of overlap with fuzzy set representing entity data 112 and examples of deficiency data 120 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both entity data 112 and examples of deficiency data 120 have fuzzy sets, deficiency data 120 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
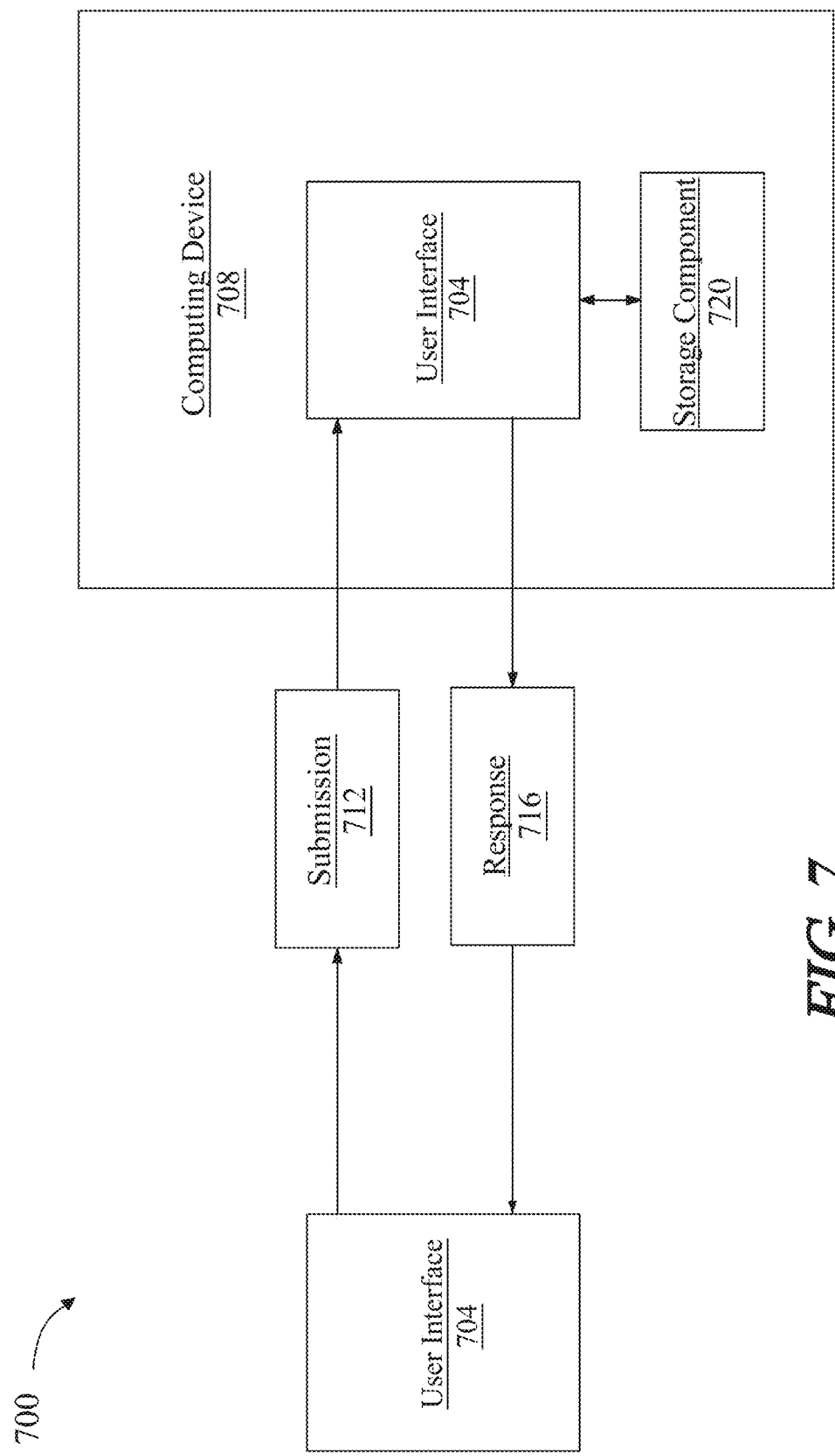
FIG. 7 is an illustration of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both of submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor may process a submission 7112 using one or more of keyword recognition, pattern matching, and natural language processing. In some embodiments, processor may employ real-time learning with evolutionary algorithms. In some cases, processor may retrieve a pre-prepared response from at least a storage component 720, based upon submission 712. Alternatively or additionally, in some embodiments, processor communicates a response 716 without first receiving a submission 712, thereby initiating conversation. In some cases, processor may communicate an inquiry to user interface 704; and the processor is configured to process an answer to the inquiry in a following submission 712 from the user interface 704. In some cases, an answer to an inquiry present within a submission 712 from a user device 704 may be used by computing device 708 as an input to another function.

With continued reference to FIG. 7, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "Chatbot input" is any response that a candidate or employer inputs in to a chatbot as a response to a prompt or question.

With continuing reference to FIG. 7, computing device 708 may be configured to respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational indication may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8:
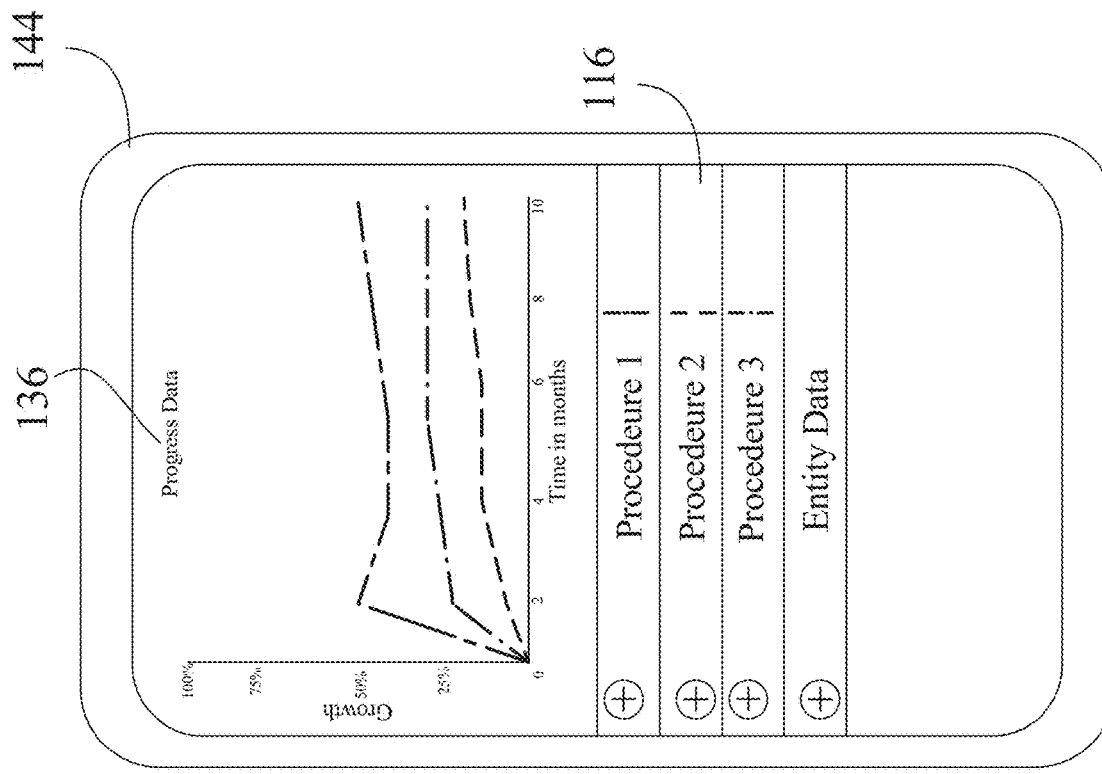
FIG. 8 is an exemplary embodiment of a user interface component.

Now referring to FIG. 8, an exemplary representation of a user interface component is presented. User interface 800 may include a display device such as display device 144. In an embodiment, user interface 800 may display progress data 136. Progress data 136 may be displayed in a graphical manner. Progress data 136 may be displayed as the overall improvement of a procedure over a given time. Alternatively, Progress data 136 may be displayed as the overall improvement of each task of a series of tasks associated with procedure data. In an embodiment, progress data 136 illustrated within FIG. 8 may change based on the improvement of the procedure or the deficiencies within the procedure. In some embodiments, user interface 800 may display a plurality of questions that require the user to enter information regarding the entity profile 108 and entity data 112, wherein the user is able to enter information regarding themselves or their entity. This may be done using the chatbot system of FIG. 7, which may be implemented using user interface 800. User interface 800 may additionally display an automation suggestion 124 and the deficiency data 120, wherein user interface 800 may display how the progress data 136 is generated.

Figure 9:
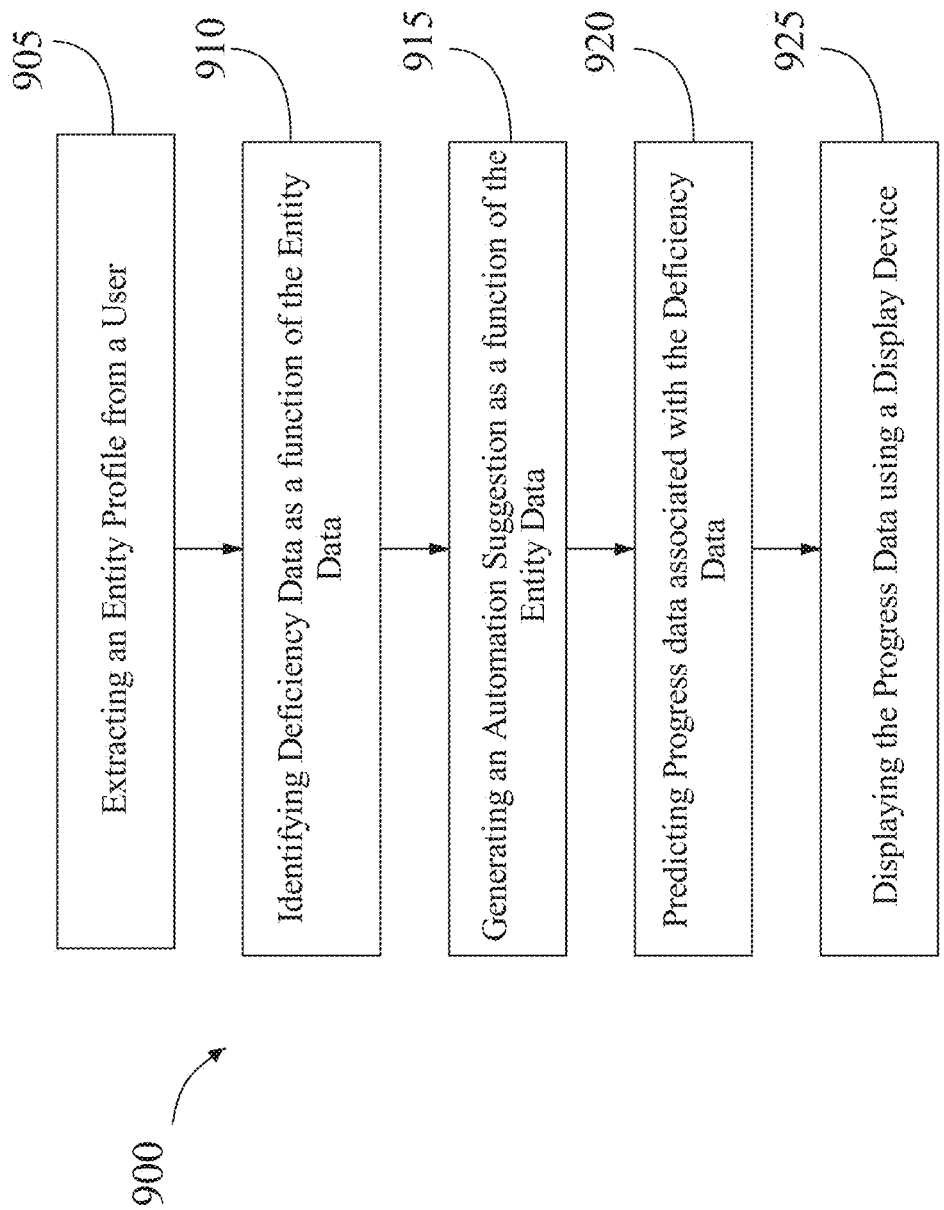
FIG. 9 is a flow diagram of an exemplary method for the detection and improvement of deficiency data.

Referring now to FIG. 9, a flow diagram of an exemplary method 900 for the detection and improvement of deficiency data is illustrated. At step 905, method 900 includes receiving, using at least a processor, an entity profile from a user, wherein the entity profile comprises a plurality of entity data. This may be implemented as described and with reference to FIGS. 1-9. In some embodiments, extracting the entity profile may comprise extracting the entity profile using a WebCrawler or a chatbot. In some embodiments, the entity data may comprise procedure data.

Still referring to FIG. 9, At step 910, method 900 includes identifying, using the at least a processor, deficiency data as a function of the entity data. This may be implemented as described and with reference to FIGS. 1-9.

Still referring to FIG. 9, At step 915, method 900 includes generating, using the at least a processor, an automation suggestion as a function of the deficiency data and the entity data. This may be implemented as described and with reference to FIGS. 1-9. In some embodiments, generating the automation suggestion may be done using the automation machine learning model. Wherein generating the automation suggestion using the automation machine learning model comprises training the automation machine learning model using automation training data, wherein the automation training data contains a plurality of data entries containing the entity data as an input correlated to the automation suggestion as an output and generate the automation suggestion as a function of the deficiency data using a trained automation machine learning model. In other embodiments, wherein the automation suggestion may comprise a software suggestion. In some embodiments, generating the automation suggestion comprises identifying a deficient task as function of the deficiency data, determine an automation identifier as a function of the deficient task, and generating the automation suggestion as a function of the automation identifier.

Still referring to FIG. 9, At step 920, method 900 includes predicting, using the at least a processor, progress data associated with the deficiency data as function of the implementation of the automation suggestion. This may be implemented as described and with reference to FIGS. 1-9. In some embodiments, predicting the progress data may comprise predicting the progress data using an entity simulation, wherein the entity simulation may be generated using a prediction machine learning model.

Still referring to FIG. 9, At step 925, method 900 includes displaying, using the at least a processor, the progress data a using a display device. This may be implemented as described and with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
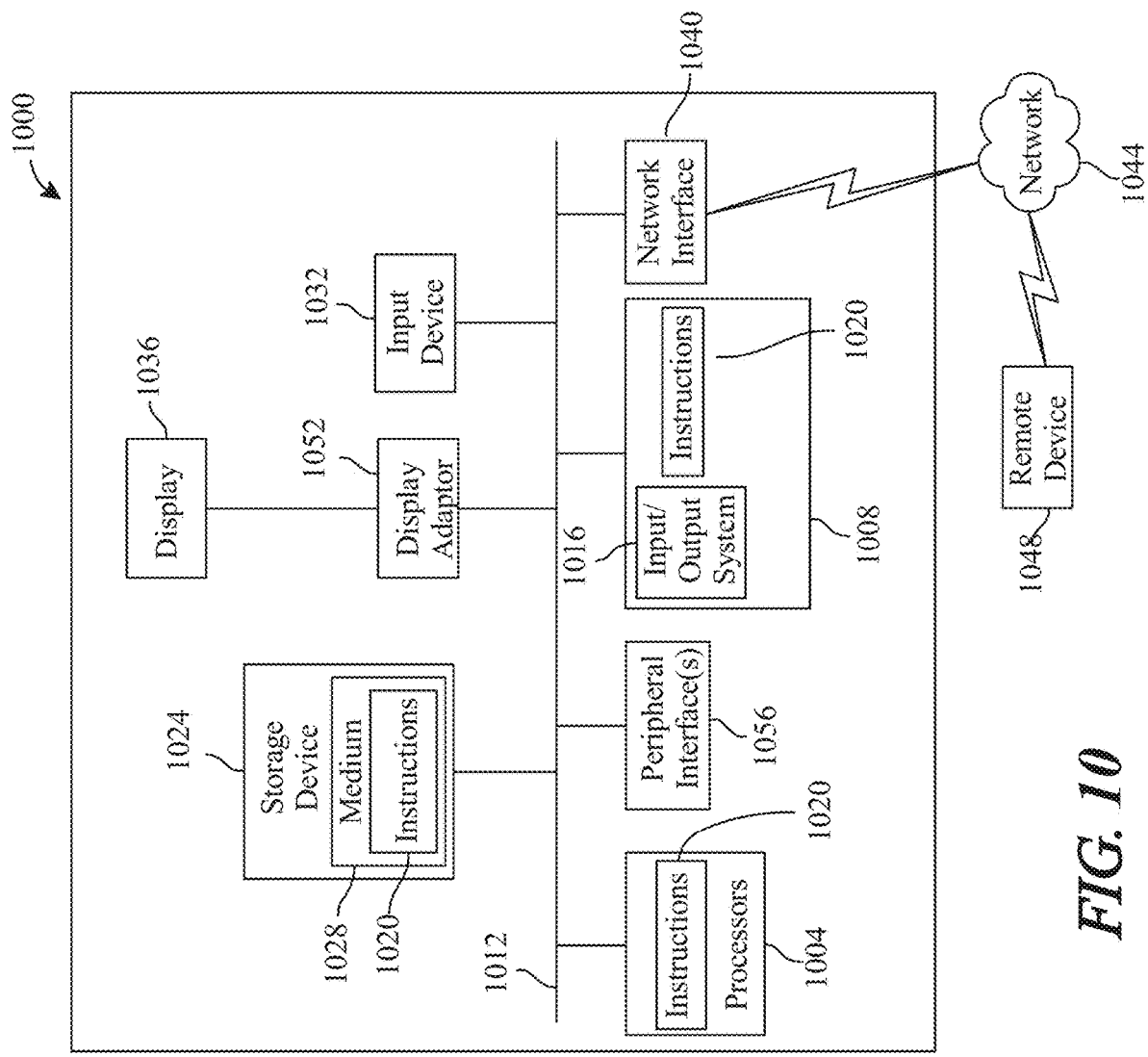
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for a detection and improvement of deficiency data, wherein the apparatus comprises:
  at least a processor; and
  a memory communicatively connected to the at least a processor, wherein the memory contains instructions configuring the at least a processor to:
    receive an entity profile from a user, wherein the entity profile comprises a plurality of entity data comprising data related to a corporation, wherein the entity data further comprises financial records of the corporation,
    wherein:
      the entity profile is received from the user by extracting the entity profile using a chatbot; and
      the chatbot is configured to respond to a chatbot input using a plurality of overlapping decision trees with interconnected nodes including shared intermediate nodes;
    identify deficiency data as a function of the entity data, wherein the deficiency data is a deficient procedure associated with procedure data and wherein a determination of the deficient procedure is calculated by a deficiency quantifier utilizing a quantification classifier which further comprises:
      receiving quantification training data, wherein the quantification training data correlates a plurality of entity profile data, entity data and procedure data to a plurality of examples of quantifier data;
      training, iteratively, the quantification classifier using the quantification training data, wherein training the quantification classifier includes retraining the quantification classifier with feedback from previous iterations of the quantification classifier; and
      generating the deficiency quantifier using the trained quantification classifier;
    generate an automation suggestion as a function of the deficiency data and the entity data, wherein the automation suggestion comprises a notification that a deficient program is solved using a technical solution to a deficiency, wherein generating the automation suggestion comprises generating an automation model, wherein generating the automation model further comprises:
  training an automation machine learning model iteratively as a function of automation training data, wherein the automation training data comprises the deficiency data and the plurality of entity data as inputs and the automation suggestion as an output, and wherein a current state of the plurality of entity data and the entity profile is compared to previous iterations of the plurality of entity data and the entity profile; and
  generating the automation suggestion as a function of the deficiency data and the plurality of entity data using the trained automation machine learning model, wherein the automation suggestion comprises a software solution, wherein the software solution further comprises a requirement to implement a software technology in a process represented by the procedure data;
predict, using a prediction machine learning model, progress data associated with the deficiency data as a function of the automation suggestion, wherein predicting the progress data comprises:
  receiving prediction training data comprising a plurality of automation suggestions comprising software solutions, the automation suggestions comprising requirements to implement a software technology in a process represented by the procedure data, correlated to a plurality of progress data;
  training, iteratively, the prediction machine learning model as a function of the prediction training data; and
  generating the progress data as a function of the prediction machine learning model; and
display the progress data using a display device.

2. The apparatus of claim 1, wherein receiving the entity profile comprises extracting the entity profile using a web crawler.

3. The apparatus of claim 1, wherein generating the automation suggestion further comprises:
  identifying a deficient task as function of the deficiency data;
  determine an automation identifier as a function of the deficient task; and
  generating the automation suggestion as a function of the automation identifier.

4. The apparatus of claim 1, wherein the entity data comprises procedure data.

5. The apparatus of claim 1, wherein predicting the progress data comprises predicting the progress data using an entity simulation.

6. The apparatus of claim 5, wherein the entity simulation is generated using a simulation machine learning model.

7. A method for a detection and improvement of deficiency data, wherein the method comprises:
  receiving, using at least a processor, an entity profile from a user, wherein the entity profile comprises a plurality of entity data comprising data related to a corporation, wherein the entity data further comprises financial records of the corporation, wherein:
    the entity profile is received from the user by extracting the entity profile using a chatbot; and
    the chatbot is configured to respond to a chatbot input using a plurality of overlapping decision trees with interconnected nodes including shared intermediate nodes;
  identifying, using the at least a processor, deficiency data as a function of the entity data, wherein the deficiency data is a deficient procedure associated with procedure data and wherein a determination of the deficient procedure is calculated by a deficiency quantifier utilizing a quantification classifier which further comprises:
    receiving quantification training data, wherein the quantification training data correlates a plurality of entity profile data, entity data and procedure data to a plurality of examples of quantifier data;
    training, iteratively, the quantification classifier using the quantification training data, wherein training the quantification classifier includes retraining the quantification classifier with feedback from previous iterations of the quantification classifier; and
    generating the deficiency quantifier using the trained quantification classifier;
  generating, using the at least a processor, an automation suggestion as a function of the deficiency data and the entity data, wherein the automation suggestion comprises a notification that a deficient program is solved using a technical solution to the deficiency, wherein generating the automation suggestion comprises generating an automation model, wherein generating the automation model further comprises:
    training an automation machine learning model iteratively as a function of automation training data, wherein the automation training data comprises the deficiency data and the plurality of entity data as inputs and the automation suggestion as an output, and wherein a current state of the plurality of entity data and the entity profile is compared to previous iterations of the plurality of entity data and the entity profile; and
    generating the automation suggestion as a function of the deficiency data and the plurality of entity data using the trained automation machine learning model, wherein the automation suggestion comprises a software solution, wherein the software solution further comprises a requirement to implement a software technology in a process represented by the procedure data;
  predicting, using a prediction machine learning model, progress data associated with the deficiency data as function of the automation suggestion, wherein predicting the progress data comprises:
    receiving prediction training data comprising a plurality of automation suggestions comprising software solutions, the automation suggestions comprising requirements to implement a software technology in a process represented by the procedure data, correlated to a plurality of progress data;
    training, iteratively, the prediction machine learning model as a function of the prediction training data; and
    generating the progress data as a function of the prediction machine learning model; and
  displaying, using the at least a processor, the progress data a using a display device.

8. The method of claim 7, wherein receiving the entity profile comprises extracting the entity profile using a web crawler.

9. The method of claim 7, wherein generating the automation suggestion comprises:
- identifying a deficient task as function of the deficiency data;
- determine an automation identifier as a function of the deficient task; and
- generating the automation suggestion as a function of the automation identifier.

10. The method of claim 7, wherein the entity data comprises procedure data.

11. The method of claim 7, wherein predicting the progress data comprises predicting the progress data using an entity simulation.

12. The method of claim 11, wherein the entity simulation is generated using a 20. simulation machine learning model.

\* \* \* \* \*